US008960798B2

(12) United States Patent
Ito

(10) Patent No.: US 8,960,798 B2
(45) Date of Patent: Feb. 24, 2015

(54) RECLINING APPARATUS

(75) Inventor: Koji Ito, Kanagawa (JP)

(73) Assignee: Shiroki Corporation, Kanagawa (JP)

( * ) Notice: Subject to any disclaimer, the term of this patent is extended or adjusted under 35 U.S.C. 154(b) by 32 days.

(21) Appl. No.: 13/819,909

(22) PCT Filed: May 30, 2011

(86) PCT No.: PCT/JP2011/062340
§ 371 (c)(1),
(2), (4) Date: Feb. 28, 2013

(87) PCT Pub. No.: WO2012/029368
PCT Pub. Date: Mar. 8, 2012

(65) Prior Publication Data
US 2013/0161994 A1    Jun. 27, 2013

(30) Foreign Application Priority Data
Sep. 1, 2010  (JP) .................. 2010-195503

(51) Int. Cl.
*B60N 2/235*  (2006.01)
*A47C 1/025*  (2006.01)

(52) U.S. Cl.
CPC .............. *A47C 1/025* (2013.01); *B60N 2/2356* (2013.01)
USPC ..................... 297/367 P; 297/366

(58) Field of Classification Search
CPC ..... B60N 2/2356; B60N 2/2352; A47C 1/025
USPC ............................................. 297/366, 367 P
See application file for complete search history.

(56) References Cited

U.S. PATENT DOCUMENTS

| 5,590,931 A * | 1/1997 | Fourrey et al. ................. 297/366 |
| 6,149,235 A | 11/2000 | Fahim |
| 6,820,937 B1 * | 11/2004 | Esaki et al. ................... 297/366 |
| 7,828,385 B2 * | 11/2010 | Reubeuze ..................... 297/366 |
| 2006/0022503 A1 | 2/2006 | Reubeuze et al. |
| 2011/0254338 A1 * | 10/2011 | Fisher et al. ............... 297/367 P |

FOREIGN PATENT DOCUMENTS

| CN | 1727218 A | 2/2006 |
| JP | 4186610 | 9/2008 |
| JP | 2010-063508 | 3/2010 |
| WO | WO 01/12462 A1 | 2/2001 |

OTHER PUBLICATIONS

International Search Report issued by the Japanese Patent Office in international Application No. PCT/JP2011/062340, mailed Jul. 5, 2011 (1 page).

* cited by examiner

*Primary Examiner* — Sarah B McPartlin
(74) *Attorney, Agent, or Firm* — Cheng Law Group, PLLC

(57) ABSTRACT

A reclining apparatus, in which a force causes an operating shaft to incline with respect to an axis of the relative rotation thereof, provides a reclining apparatus having good operability. More specifically, an operating shaft 77 is formed with a flange portion 75 so as to protrude in the radial direction of the operating shaft 77 so as to abut against a bottom portion 21a of a ratchet (first member) 21, and restrict the operating shaft 77 from inclining in any direction with respect to the bottom portion 21a of the ratchet 21 over the entire area of the outer peripheral surface in the circumferential direction on an outer peripheral surface thereof.

4 Claims, 7 Drawing Sheets

RECLINING APPARATUS

TECHNICAL FIELD

The present invention relates to a reclining apparatus including: a bottomed cylindrical first member formed with inner teeth on an inner cylindrical surface along the circumferential direction; a second member stacked on the side of an opened surface of the first member and provided so as to be capable of rotating relative to the first member in the circumferential direction; a pawl provided on the second member so as to be capable of moving and formed with outer teeth capable of engaging the inner teeth; a rotation cam provided so as to be capable of rotating about an axis of the relative rotation, formed with a non-circular through hole at a center of rotation, and configured to move the pawl to a locked position where the outer teeth of the pawl engage the inner teeth of the first member by the rotation in one direction; an operating shaft fitted to the non-circular through hole of the rotation cam and configured to rotate integrally with the rotation cam; and a spiral spring engaging the operating shaft at an inner end portion thereof, engaging the second member at an outer end portion thereof, and configured to urge the rotation cam so as to position the pawl in the locked position.

BACKGROUND ART

Description will be given with reference to FIG. 6 and FIG. 7. FIG. 6 is a configuration drawing of a seat, and FIG. 7 is an exploded perspective view of a seat reclining apparatus for a vehicle of the related art.

As illustrated in FIG. 6, a seat 1 includes a seat cushion 2 configured to support buttocks of a seated person, and a seatback 3 provided so as to be tiltable in the fore-and-aft direction with respect to the seat cushion 2 and configured to support a back of the seated person. Reference numeral 4 denotes a reclining apparatus provided on an axis of rotation of the tilting movement of the seatback 3 and configured to allow/restrict the tilting movement of the seatback 3.

Subsequently, the reclining apparatus 4 will be described with reference to FIG. 7. In the drawing, the reclining apparatus 4 includes a ratchet (first member) 7 formed with inner teeth 7a extending along the circumferential direction of the circle having a center at the center of the relative rotation and having an opened surface on one of the surfaces and a base plate (second member) 5 stacked on the ratchet 7 on the side of the opened surface and provided so as to be capable of rotating relative to the ratchet 7 in the circumferential direction.

The base plate 5 includes four pawls 10 each having outer teeth 10d capable of engaging the inner teeth 7a arranged thereon. The base plate 5 is formed with a guide 5a configured to guide the respective pawls 10 in the radial direction of the relative rotation. Therefore, the respective pawls 10 are capable of moving in the radial direction of the relative rotation.

A rotation cam 9 is configured to move the respective pawls 10 to the locked position where the outer teeth 10d of the respective pawls 10 engage the inner teeth 7a when rotating in one direction about an axis of the relative rotation by pushing surfaces opposite to the surfaces where the outer teeth 10d of the respective pawls 10 are formed.

Three of the four pawls 10 are each formed with a projecting portion 10a. The remaining one pawl is formed with two projecting portions 10b and 10c. The projecting portions 10b and 10c are formed on the side of the outer teeth 10d with respect to the above-described projecting portion 10a.

A release plate 11 is formed with three cam grooves 11a that allow engagement of the projecting portions 10a formed on the three pawls 10. In addition, a cam groove 11c that allows engagement of the projecting portions 10b and 10c formed on the remaining one pawl 10 is formed. Then, by the rotation of the release plate 11 in the other direction about the axis of the relative rotation, the respective pawls 10 are moved to an unlocked position where the engagement between the outer teeth 10d and the inner teeth 7a is released.

The rotation cam 9 and the release plate 11 rotate integrally by the engagement of three projecting portions 9a formed on the rotation cam 9 with three holes 11b formed on the release plate 11. In other words, when the rotation cam 9 rotates in one direction about the axis of the relative rotation, the respective pawls 10 move to the locked position where the outer teeth 10d engage the inner teeth 7a, and when the rotation cam 9 rotates in the other direction about the axis of the relative rotation, the respective pawls 10 move to the unlocked position where the engagement between the outer teeth 10d and the inner teeth 7a is released.

An operating shaft 12 is connected to the rotation cam 9. On end side of the operating shaft 12 is a prismatic column portion 12a having a rectangular shape in cross section. In contrast, the other end side of the operating shaft 12 includes a circular portion 12b having a circular shape in cross section and an arm portion 12c extending in the radial direction from a peripheral surface of the circular portion 12b. Then, the rotation cam 9 is formed with a hole 9b to which the other end portion side of the operating shaft 12 is fitted at the center of rotation thereof. Therefore, the operating shaft 12, the rotation cam 9, and the release plate 11 rotate integrally.

The respective pawls 10 are urged by a spiral spring 19 locked at one end thereof with the base plate 5 and locked at the other end portion thereof with the prismatic column portion 12a of the operating shaft 12 via the rotation cam 9 so as to be located in the locked position.

Pour projecting portions 7b are formed on a bottom portion of the ratchet 7. An unlock plate 13 is arranged between the release plate 11 and the ratchet 7. The unlock plate 13 is formed with two holes 13a which allow engagement of the projecting portions 7b formed on the ratchet 7, and the unlock plate 13 is restricted from rotating about the axis of the relative rotation. The unlock plate 13 is formed with an arcuate shaped cam holes 13b having a center at the axis of the relative rotation. The cam holes 13b include two wide portions 13c and a narrow portion 13d interposed between the wide portions 13c. The projecting portions 10b and 10c of the pawls 10 engage the cam holes 13b. In a case where the base plate 5 and the ratchet 7 rotate relative to each other and the projecting portions 10b and 10c of the pawls 10 are located in the narrow portion 13d of the cam holes 13b, the pawls 10 having the projecting portions 10b and 10c are configured to be retained in the unlocked position.

An outer peripheral portion of the ratchet 7 and an outer peripheral portion of the base plate 5 are held by a ring-shaped outer peripheral ring 8 and are integrated.

An operation of the reclining apparatus will be described. It is assumed that the ratchet 7 is provided on the seatback side and the base plate 5 is provided on the seat cushion side.

Generally, the respective pawls 10 provided on the base plate 5 are in the locked position where the outer teeth 10d engages the inner teeth 7a of the ratchet 7 by an urging force of the spiral spring 19, and hence the relative rotation between the ratchet 7 and the base plate 5 is restricted, and the seatback 3 is in the state of incapable of rotating with respect to the seat cushion 2 (locked state).

When the operating shaft 12 is operated and the rotation cam 9 is rotated in the other direction against the urging force of the spring 19, the respective pawls 10 move to the unlocked position where the engagement between the outer teeth 10d and the inner teeth 7a is released, and allows the relative rotation between the ratchet 7 and the base plate 5, so that the seatback 3 is allowed to rotate with respect to the seat cushion 2.

When an operating force to the rotation cam 9 is released, the outer teeth 10d of the respective pawls 10 provided on the base plate 5 engage the inner teeth 7a of the ratchet 7 by the urging force of the spring 19 and the relative rotation between the ratchet 7 and the base plate 5 is restricted, so that the locked state is achieved again.

As illustrated in FIG. 6, between a first level locked state A and a reclined state D, when the operating shaft 12 is operated and the rotation cam 9 is rotated to unlock and the operating force to the operating shaft 12 is released, the pawls 10 are restored to the locked position by the urging force of the spiral spring 19, so that the locked state is achieved.

In contrast, in an unlock retained state C which is between the first level locked state A and a forward folded state B, the projecting portions 10b and 10c of the pawls 10 are positioned in the narrow portion 13d of the cam holes 13b, and even when the operating force to the operating shaft 12 is released, the respective pawls 10 are retained in the unlocked position, so that the seatback 3 may be rotated without operating the operating shaft 12.

CITATION LIST

Patent Literature

[PTL1] Japanese Patent No. 4186610

DISCLOSURE OF INVENTION

Technical Problem

However, in the reclining apparatus having the configuration as described above, the spiral spring 19 applies a force to the operating shaft 12 to incline the same with respect to the axis of the relative rotation.

When inclining in the direction of the arm portion 12c of the operating shaft 12, the inclination is restricted by the arm portion 12c. However, when the operating shaft 12 is inclined in the directions other than the direction of the arm portion 12c, the operating force which operates the operating shaft 12 is increased, and there arises a problem of degradation of the operability.

In view of such problem, it is an object of the present invention to provide a reclining apparatus providing a good operability.

Solution to Problem

The invention according to Claim 1 is a reclining apparatus including: a bottomed cylindrical first member formed with inner teeth on an inner cylindrical surface along the circumferential direction; a second member stacked on the side of an opened surface of the first member and provided so as to be capable of rotating relative to the first member in the circumferential direction; a pawl provided on the second member so as to be capable of moving and formed with outer teeth capable of engaging the inner teeth; a rotation cam provided so as to be capable of rotating about an axis of the relative rotation, formed with a non-circular through hole at a center of rotation, and configured to move the pawl to a locked position where the outer teeth of the pawl engage the inner teeth of the first member by the rotation in one direction; an operating shaft fitted to the non-circular through hole of the rotation cam and configured to rotate integrally with the rotation cam; and a spiral spring engaging the operating shaft at an inner end portion thereof, engaging the second member at an outer end portion thereof, and configured to urge the rotation cam so as to position the pawl in the locked position, wherein the operating shaft is formed with a flange portion on an outer peripheral surface thereof so as to protrude in the radial direction of the operating shaft so as to abut against a bottom portion of the first member and restrict the operating shaft from inclining in any direction with respect to the bottom portion of the first member.

The invention according to Claim 2 is the reclining apparatus according to Claim 1, wherein the flange portion is formed of a single continuous flange.

The invention according to Claim 3 is the reclining apparatus according to Claim 1, wherein the flange portion includes a plurality of non-continuous flanges.

Advantageous Effects of Invention

According to the reclining apparatus as disclosed in Claim 1 to Claim 3, with the formation of the flange portion on the outer peripheral surface of the operating shaft so as to protrude in the radial direction of the operating shaft, and abut against the bottom portion of the first member and restrict the inclination of the operating shaft in any direction with respect to the bottom portion of the first member, even though the force which causes the operating shaft to incline with respect to the axis of the relative rotation is applied to the operating shaft by the spiral spring, the inclination of the operating shaft is restricted and the operating force for operating the operating shaft is not increased, so that a good operability is achieved.

DESCRIPTION OF EMBODIMENT

Figure 1:
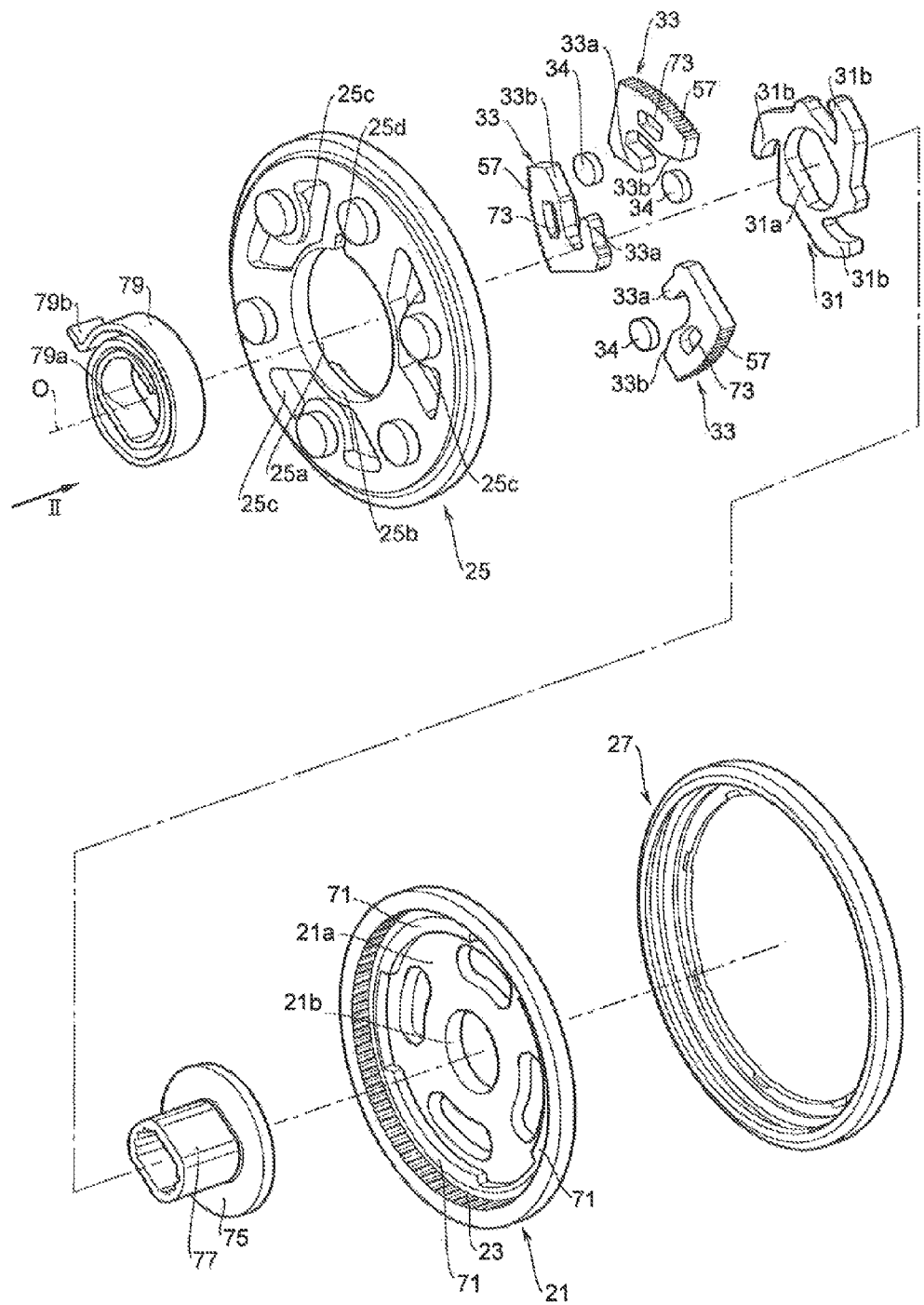
FIG. 1 is an exploded perspective view of a reclining apparatus of an embodiment.
Figure 2:
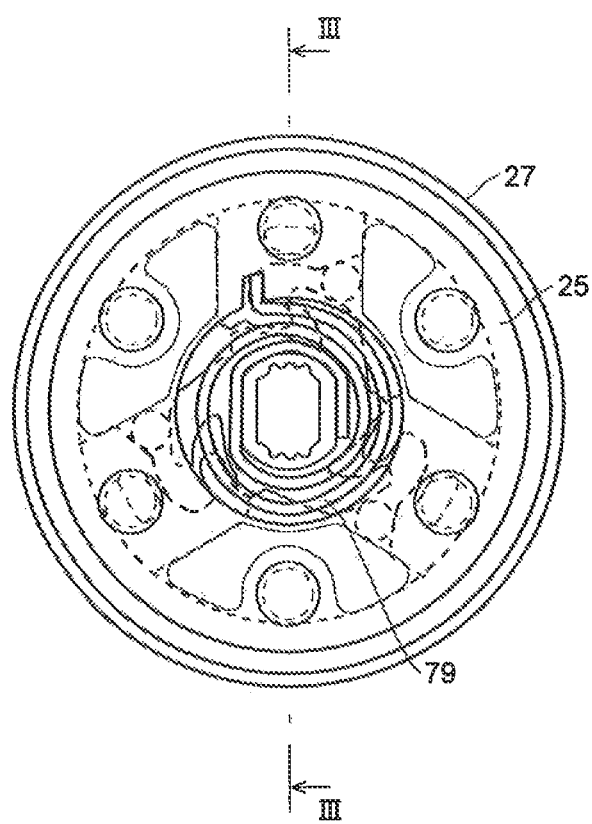
FIG. 2 is a perspective view of a ratchet illustrated in FIG. 1 viewed from an arrow II.
Figure 3:
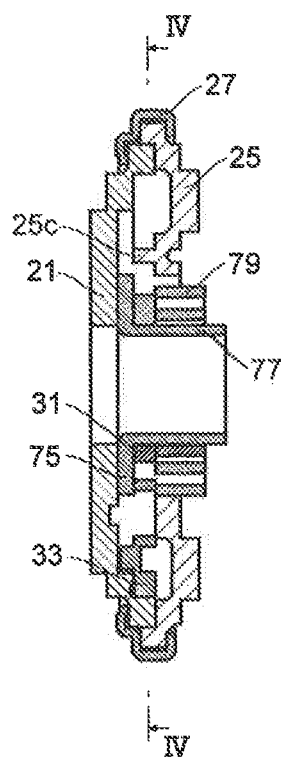
FIG. 3 is a cross-sectional view taken along a section line III-III in FIG. 2.
Figure 4:
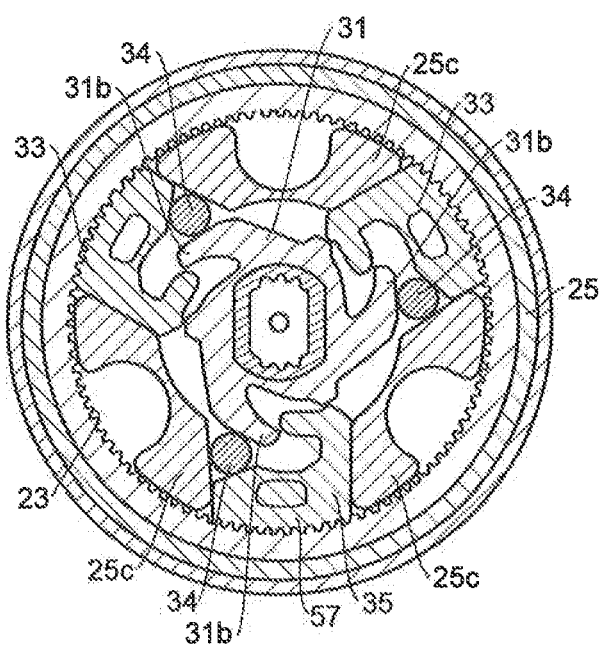
FIG. 4 is a cross-sectional view taken along a section line IV-IV in FIG. 3 for explaining a locked state.
Figure 5:
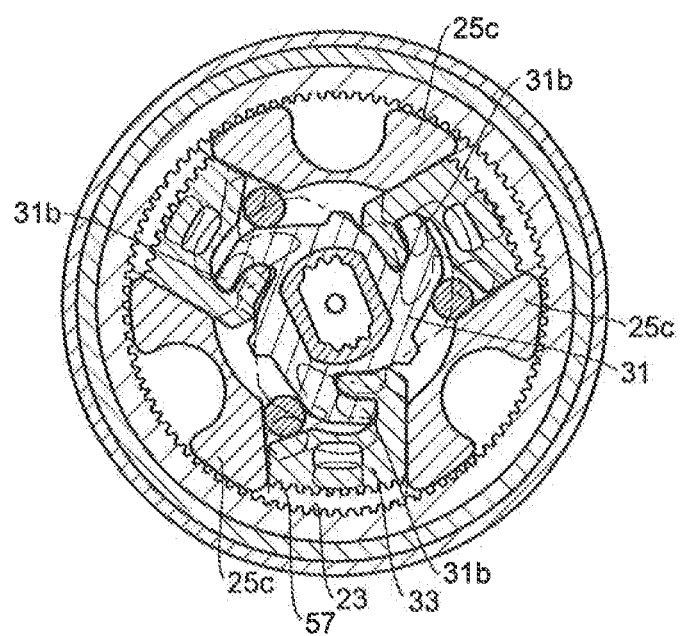
FIG. 5 is a drawing for explaining an unlocked state of FIG. 4.

Referring now to the drawings, an embodiment of the present invention will be described. FIG. 1 is an exploded perspective view of a reclining apparatus of the embodiment, FIG. 2 is a perspective view of a ratchet illustrated in FIG. 1 viewed from an arrow II-II, FIG. 3 is a cross-sectional view taken along a section line III-III in FIG. 2, FIG. 4 is a cross-sectional view taken along a section line IV-IV in FIG. 3 for explaining a locked state, and FIG. 5 is a drawing for explaining an unlocked state of FIG. 4.

Figure 6:
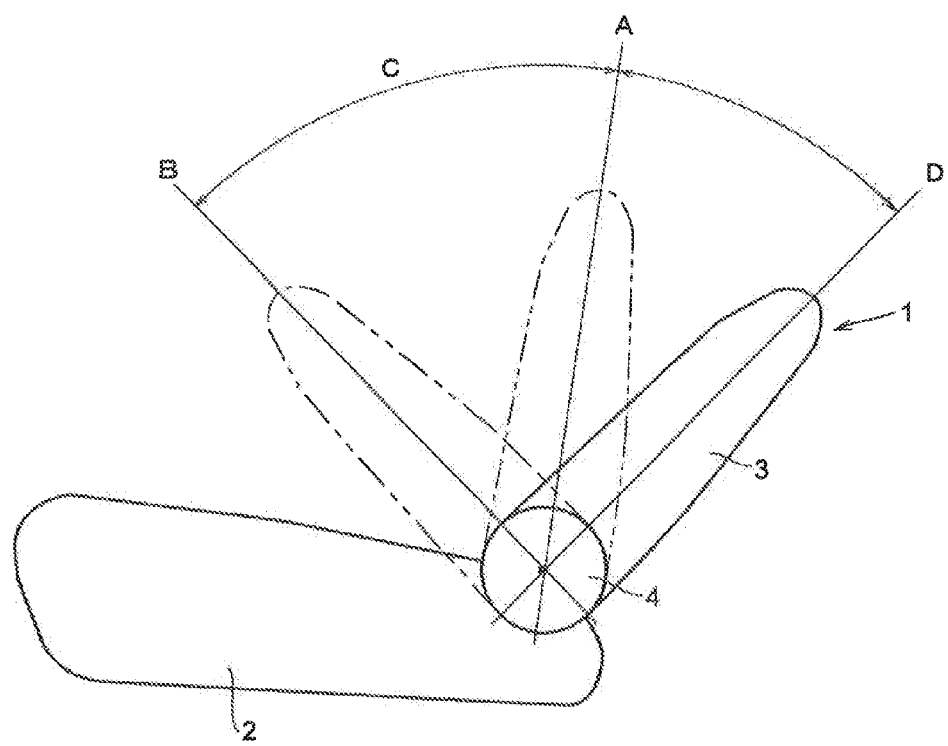
FIG. 6 is a configuration drawing of a seat.
Figure 7:
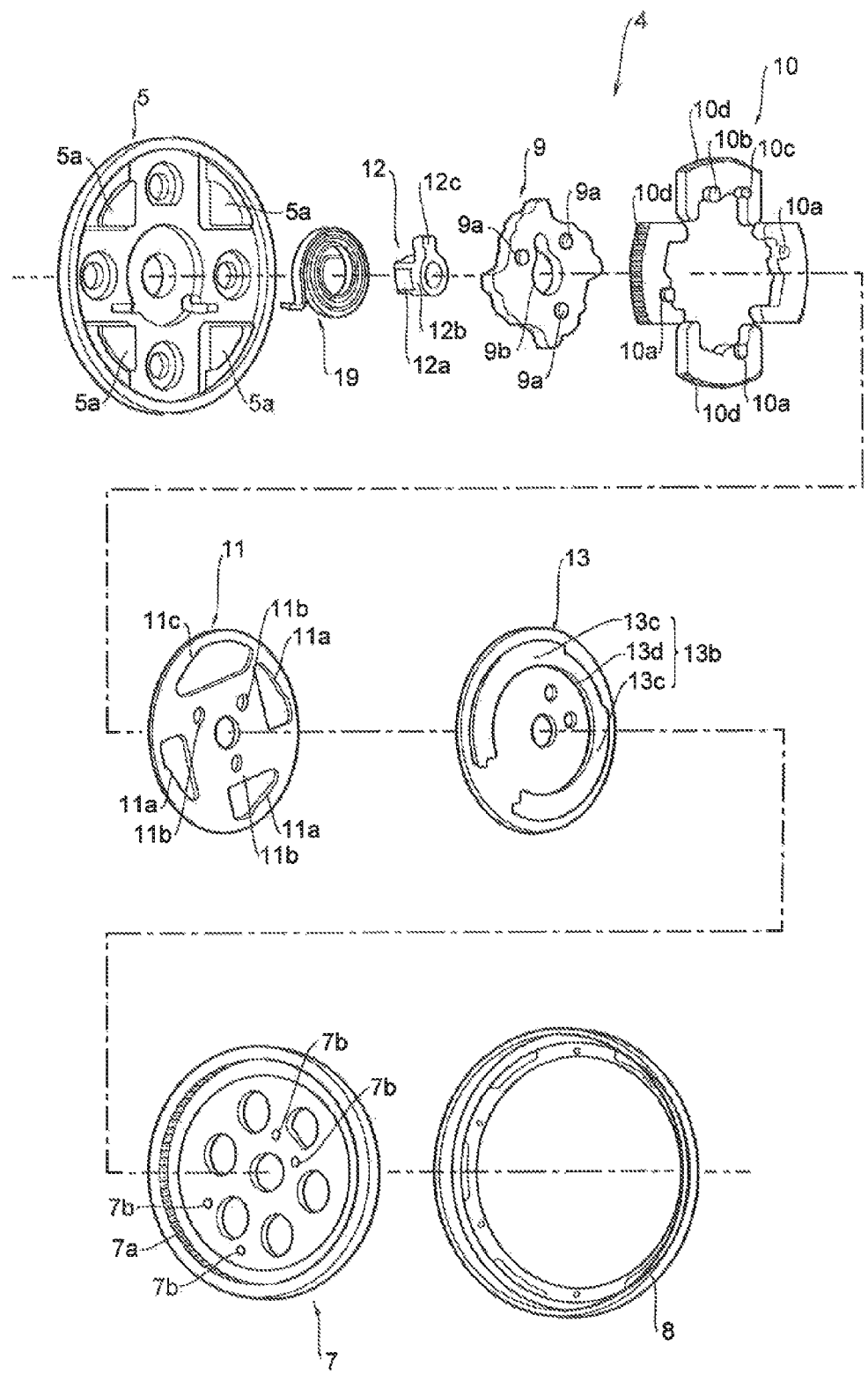
FIG. 7 is an exploded perspective view of a seat reclining apparatus for a vehicle of the related art.

The reclining apparatus of an example of the embodiment is provided on an axis of rotation of a tilting movement of a seatback 3 in the same manner as a reclining apparatus 4 in FIG. 6.

In FIG. 1, a ratchet (first member) 21 provided on the side of the seatback has a bottomed cylindrical shape having an opened surface on one of the surfaces formed by half punching a disk-shaped plate material by pressing. An inner cylindrical surface of the ratchet 21 is formed with inner teeth 23 along the entire circumferential area. A center of a bottom portion 21a is formed with a through hole 21b.

A base plate (second member) 25 provided on the side of the seat cushion also has a bottomed cylindrical shape having an opened surface on one of the surfaces formed by half punching a disk-shaped plate material by pressing. The diameter of a bottom portion 25a of the bottomed cylinder is set to be slightly larger than the outer diameter of the ratchet 21. Then, the ratchet 21 is fitted to the bottom portion 25a and the base plate 25 and the ratchet 21 are capable of rotating relative to each other. The ratchet 21 is formed with a though hole 25b at a center of the ratchet 21.

As illustrated in FIG. 3, an outer peripheral portion of the ratchet 21 and an outer peripheral portion of the base plate 25 are held by a ring-shaped outer peripheral ring 27, and the ratchet 21 and the base plate 25 are not separated in the direction of an axis of the relative rotation (O in FIG. 1) and are retained so as to be capable of rotating relative to each other.

Returning back to FIG. 1, a rotation cam 31 is arranged in a space formed by the bottom portion 21a of the ratchet 21 and the bottom portion 25a of the base plate 25. A non-circular (oval-shaped) through hole 31a is formed at a center of the rotation cam 31.

Three pawls 33 are arranged on the base plate 25 so as to be positioned on the outside of the rotation cam 31. The pawls 33 include the outer teeth 57 capable of engaging the inner teeth 23. A circular cam 34 is arranged between the pawls 33 and the rotation cam 31.

As illustrated in FIG. 4, the base plate 25 is formed with a guide 25c configured to guide the respective pawls 33 in the radial direction of the relative rotation. Therefore, the respective pawls 33 are capable of moving in the radial direction of the relative rotation.

Returning back to FIG. 1, the pawls 33 are each formed with a hook portion 33a extending in the direction intersecting the direction of movement of the pawls 33 on a surface facing the surface where outer teeth 57 of the pawls 33 are formed. In contrast, the rotation cam 31 is formed with three hook portions 31b which are engageable and disengageable with the hook portion 33a of the respective pawls 33 on a peripheral portion thereof. In addition, the pawls 33 are each formed with a locking surface 33b against which the circular cam 34 is capable of abutting at a position adjacent to the hook portion 33a on a surface facing the surface where the outer teeth 57 of the pawls 33 are formed.

As illustrated in FIG. 4, when the rotation cam 31 rotates in one direction (clockwise in the drawing), the hook portions 31b of the rotation cam 31 press the locking surfaces 33b of the pawls 33 via the circular cam 34 to move the pawls 33 in the direction away from the axis of the relative rotation, and the locked position in which the outer teeth 57 of the pawls 33 engage the inner teeth 23 of the ratchet 21 is achieved.

In contrast, as illustrated in FIG. 5, when the rotation cam 31 rotates in the other direction (counterclockwise in the drawing) when the pawls 33 are in the locked position, the hook portions 31b of the rotation cam 31 engage the hook portions 33a of the pawls 33, pulls the pawls 33 upward in the direction toward the axis of the relative rotation thereof, and so that the unlocked position in which the engagement between the outer teeth 57 of the pawls 33 and the inner teeth 23 of the ratchet 21 is released is achieved.

In this example of embodiment, an unlock retaining mechanism including three arcuate guides 71 extending along the circumferential direction formed on the ratchet 21 on the inner cylindrical surface on the side of the bottom portion 21a with respect to the inner teeth 23 thereof and projecting portions 73 formed on the respective pawls 33 on surfaces facing the bottom portion 21a of the ratchet 21 through a half punching process (half blanking: a process for making a projecting shape by stopping the punching work on the way).

In this configuration, when the projecting portions 73 of the respective pawls 33 abut against the arcuate guides 71, the pawls 33 are retained in the unlocked position.

An operating shaft 77 having a non-circular shape (the oval shape) in cross section and configured to rotate integrally with the rotation cam 31 fits in the non-circular through hole 31a of the rotation cam 31. The operating shaft 77 is formed with a flange portion 75 over the entire area of the outer peripheral surface in the circumferential direction so as to protrude in the radial direction of the operating shaft 77 so as to abut against the bottom portion 21a of the ratchet 21, and restrict the operating shaft 77 from inclining in any direction with respect to the bottom portion 21a of the ratchet (first member) 21 on an outer peripheral surface of the operating shaft 77. The configuration of the flange portion 75 of the embodiment is a single continuous flange formed over the entire area of the outer peripheral surface of the operating shaft 77 in the circumferential direction. The flange portion 75 may be composed of a plurality of non-continuous flanges. In this case, the angle between the adjacent flange and a gap in the circumferential direction only has to be smaller than 180 degrees in order to restrict the operating shaft 77 from inclining in any direction with respect to the bottom portion 21a of the ratchet (first member) 21.

In addition, the operating shaft 77 is set to have a height exposing to the outside from the through hole 25b of the base plate 25.

A spiral spring 79 formed by processing an elongated leaf spring material into a spiral shape is arranged in the through hole 25b of the base plate 25. An inner end portion 79a of the spiral spring 79 is locked by being wound on the operating shaft 77, and an outer end portion thereof is locked on a notched portion 25d formed on a peripheral surface of the through hole 25b of the base plate 25. Therefore, the pawls 33 are urged toward the locked position by an urging force of the spiral spring 79 via the rotation cam 31.

Referring now to FIG. 4 and FIG. 5, an operation of the reclining apparatus of this embodiment will be described.

As illustrated in FIG. 4, when no operating force is applied on the rotation cam 31, the rotation cam 31 rotates in one direction (clockwise in the drawing) by the urging force of the spiral spring 79, the hook portions 31b of the rotation cam 31 press the locking surfaces 33b of the pawls 33 via the circular cam 34 to move the pawls 33 in the direction away from the axis of the relative rotation, and the locked position in which the outer teeth 57 of the pawls 33 engage the inner teeth 23 of the ratchet 21 is achieved. Therefore, the relative rotation between the ratchet 21 and the base plate 25 is restricted, and the seatback is in the state of incapable of rotating with respect to the seat cushion (locked state).

As illustrated in FIG. 5, when the operating shaft 77 is operated against the urging force of the spiral spring 79 to rotate the rotation cam 31 in the other direction (counterclockwise in the drawing), the hook portions 31b of the rotation cam 31 engage the hook portions 33a of the pawls 33, pulls the pawls 33 upward in the direction toward the axis of the relative rotation of the pawls 33, and takes the unlocked position in which the engagement between the outer teeth 57 of the pawls 33 and the inner teeth 23 of the ratchet 21 is released. Therefore, the relative rotation between the ratchet 21 and the base plate 25 is enabled, and the seatback is allowed to rotate with respect to the seat cushion.

When the operating force to the operating shaft 77 is released, as illustrated in FIG. 4, the pawls 33 are restored to the locked position in which the outer teeth 57 engage the inner teeth 23 of the ratchet 21 by the urging force of the spiral spring 79 and the relative rotation between the ratchet 21 and the base plate 25 is restricted, so that the locked state is achieved again.

In contrast, in an unlock retained state C which is between a first level locked state A and a forward folded state B illustrated in FIG. 6, even when the operating force to the operating shaft 77 is unlocked by the above-described unlock retaining mechanism, the pawls 33 are retained in the unlocked position, so that the seatback can be rotated without operating the operating shaft 77. In other words, in the unlock retained state C illustrated in FIG. 6, the projecting portions 73 of the respective pawls 33 are located on the arcuate-shaped arcuate guides 71, and the operating force to the operating shaft 77 is released, the pawls 33 are retained in the unlocked position, and the relative rotation between the ratchet 21 and the base plate 25 is enabled.

According to the reclining apparatus of such a configuration, with the formation of the flange portion 75 on the entire area of the outer peripheral surface of the operating shaft 77 in the circumferential direction of the outer peripheral surface so as to protrude in the radial direction of the operating shaft 77 and abut against the bottom portion 21a of the ratchet 21, even though the force which causes the operating shaft 77 to incline with respect to the axis of the relative rotation is applied to the operating shaft 77 by the spiral spring 79, the inclination of the operating shaft 77 is restricted and the operating force for operating the operating shaft 77 is not increased, so that a good operability is achieved.

The present invention is not limited to the embodiment described above. In the embodiment described above, the ratchet 21 is provided on the seatback side, and the base plate 25 is provided on the seat cushion side. In contrast, however, it is also possible to provide the base plate 25 on the seatback side and the ratchet 21 on the seat cushion side.

REFERENCE SIGNS LIST 21 ratchet
21a bottom portion
25 base plate
75 flange portion
77 operating shaft

The invention claimed is:

1. A reclining apparatus comprising:
   a bottomed cylindrical first member formed with inner teeth on an inner cylindrical surface along the circumferential direction;
   a second member stacked on a side of an opened surface of the first member and provided so as to be capable of rotating relative to the first member in the circumferential direction;
   a pawl provided on the second member so as to be capable of moving and formed with outer teeth capable of engaging the inner teeth;
   a rotation cam provided so as to be capable of rotating about an axis of the relative rotation, formed with a non-circular through hole at a center of rotation, and configured to move the pawl to a locked position where the outer teeth of the pawl engage the inner teeth of the first member by rotation in one direction;
   an operating shaft fitted to the non-circular through hole of the rotation cam and configured to rotate integrally with the rotation cam; and
   a spiral spring engaging the operating shaft at an inner end portion thereof, engaging the second member at an outer end portion thereof, and configured to urge the rotation cam so as to position the pawl in the locked position, wherein
   the operating shaft is formed with a flange portion on an outer peripheral surface thereof so as to protrude in the radial direction of the operating shaft so as to abut against a bottom portion of the first member and restrict the operating shaft from inclining in any direction with respect to the bottom portion of the first member, and
   the rotation cam faces a surface of the flange portion, the surface being opposite to a surface of the flange portion abutting against the bottom portion of the first member.

2. The reclining apparatus according to claim 1, wherein the flange portion is formed of a single continuous flange.

3. The reclining apparatus according to claim 1, wherein the spiral spring faces a surface of the rotation cam, the surface being opposite to a surface of the rotation cam facing the flange portion.

4. The reclining apparatus according to claim 1, wherein the flange portion extends radially from a distal end of the operating shaft.

\* \* \* \* \*